United States Patent
Sen et al.

(10) Patent No.: US 10,209,928 B2
(45) Date of Patent: Feb. 19, 2019

(54) SYSTEM AND METHOD FOR AUTOMATICALLY PRINTING A TRANSLATION OF A DOCUMENT

(71) Applicant: Xerox Corporation, Norwalk, CT (US)

(72) Inventors: Rupali Sen, Bina Etawa (IN); Richard Immanuel Mathews, Chennai (IN)

(73) Assignee: XEROX Corporation, Norwalk, CT (US)

(*) Notice: Subject to any disclaimer, the term of this patent is extended or adjusted under 35 U.S.C. 154(b) by 0 days.

(21) Appl. No.: 15/483,334

(22) Filed: Apr. 10, 2017

(65) Prior Publication Data

US 2018/0293030 A1    Oct. 11, 2018

(51) Int. Cl.
*G06F 3/12*    (2006.01)
*G06F 17/28*   (2006.01)

(52) U.S. Cl.
CPC .......... *G06F 3/1204* (2013.01); *G06F 3/1257* (2013.01); *G06F 3/1297* (2013.01); *G06F 17/2836* (2013.01)

(58) Field of Classification Search
None
See application file for complete search history.

(56) References Cited

U.S. PATENT DOCUMENTS

2006/0245005 A1   11/2006  Hall et al.
2008/0077625 A1*  3/2008   Ferlitsch ........... G06F 17/30569
2008/0297845 A1* 12/2008   Sakamoto ............. G06F 21/608
                                                        358/1.15
2010/0238478 A1*  9/2010   Yamada ............... H04N 1/0048
                                                        358/448
2011/0242580 A1* 10/2011   Tran ...................... G06F 3/1205
                                                        358/1.15

OTHER PUBLICATIONS

Xerox Easy Translator Service User Guide (Non-Patent Literature: NPL), Xerox NPL Published in 2015.*
U.S. Appl. No. 14/938,869, filed Nov. 12, 2015, Kesavan, et al.
Brown, et al., "Xerox Translation Service Scans Documents, Prints in Other Languages," International Business Times, pp. 1-2 (Mar. 10, 2016).

* cited by examiner

*Primary Examiner* — Benny Q Tieu
*Assistant Examiner* — Haris Sabah
(74) *Attorney, Agent, or Firm* — Fay Sharpe LLP

(57) ABSTRACT

A method enables automatically printing a translation of a document without user interaction with a printer local user interface. A trigger event caused by connecting an external storage device with a printer is detected. The storage device includes a folder storing a source document or an access link it. The folder includes information which enables the printer to identify a printing protocol from a plurality of printing protocols. The protocols include at least one translation printing protocol which specifies that the source document is to be translated prior to printing. The source document is retrieved from the folder or from a remote location. The printing protocol is identified, based on the information. When the printing protocol is one of the at least one translation printing protocols, a translation of the source document is obtained in a target language. The translation of the source document is printed on the printer.

18 Claims, 5 Drawing Sheets

SYSTEM AND METHOD FOR AUTOMATICALLY PRINTING A TRANSLATION OF A DOCUMENT

BACKGROUND

The disclosed subject matter relates to document printing, and more particularly, to a system and method for automatically printing a translation of an input document, without the need for user input.

Printing systems have been developed which allow a user to provide a document for printing via a peripheral port of the printer, e.g., on an external storage device. To reduce the need for user interaction with a local user interface (LUI) on the printer, instant printing methods have been developed which print the selected document automatically. The user stores the document to be printed in a specific location in the external storage device. The printer detects the presence of the external storage device and recognizes the specific location as an instruction to print the document or documents stored in that location.

Such a method is advantageous as the user does not need to manually manipulate the file directory on the external memory device via the user interface in order to locate the file of interest on the external memory device. In addition, the user does not need to input print settings each time the user prints a file, which saves time, particularly where a large variety of documents are to be printed.

The absence of interaction with the user interface, however, limits the printing to the specific documents in the file or documents retrieved from a remote location via an access link. The printing is performed according to any instructions defining print configuration settings in the external storage device, otherwise with default settings.

In some cases, a user may wish to print a translation of a document, rather than the document itself. Services exist which provide remote translations of documents, using machine translation. However, such services generally require the user to send the document to a translation service prior to the document being input to the printer.

It would be desirable to enable a user to obtain a printed translation of a document stored on an external storage device without the need for interaction with the local user interface.

INCORPORATION BY REFERENCE

The following references, the disclosures of which are incorporated by reference, are mentioned:

U.S. application Ser. No. 14/938,869, filed Nov. 12, 2015, entitled METHODS AND SYSTEMS FOR AUTOMATICALLY PRINTING FILES, by Narayan Kesavan, et al.

US Pub. No. 20060245005, published Nov. 2, 2006, entitled SYSTEM FOR LANGUAGE TRANSLATION OF DOCUMENTS, AND METHODS, by John M. Hall, et al.

BRIEF DESCRIPTION

In accordance with one aspect of the exemplary embodiment, a method for automatically printing a translation of a document includes detecting a trigger event caused by connecting an external storage device with a printer. The external storage device includes a folder storing at least one of a source document and an access link to the source document stored at remote location. The folder includes information which enables the printer to identify a printing protocol from a plurality of printing protocols. The plurality of printing protocols includes at least one translation printing protocol which specifies that the source document is to be translated prior to printing. The source document is retrieved from the folder of the external storage device or from the remote location. The printing protocol is identified, based on the information. When the printing protocol is one of the at least one translation printing protocols, a translation of the source document is obtained in a target language. The translation of the source document is printed on the printer.

In accordance with another aspect of the exemplary embodiment, a printer for automatically printing a translation of a source document. The printer includes a peripheral port for communicating with an associated external storage device and a control unit, in communication with the peripheral port. The control unit includes memory storing instructions and a processor for implementing the instructions. The instructions include instructions for detecting a trigger event caused by connecting the external storage device with the peripheral port. The external storage device includes a folder storing at least one of a source document and an access link to the source document stored at remote location. The folder includes information which enables the printer to identify a printing protocol from a plurality of printing protocols. The plurality of printing protocols includes at least one translation printing protocol which specifies that the source document is to be translated prior to printing. The instructions further include instructions for retrieving the source document from the folder of the external storage device or the remote location, identifying the printing protocol based on the information, and when the printing protocol is one of the at least one translation printing protocols, obtaining a translation of the source document in a target language. A rendering unit prints the translation of the source document.

In accordance with another aspect of the exemplary embodiment, a method for automatically printing a translation of a document includes providing, in memory of a printer, instructions for a) detecting a trigger event caused by connecting the external storage device with the peripheral port, the external storage device including a folder storing at least one of a source document and an access link to the source document stored at remote location, the folder including information which enables the printer to identify a printing protocol from a plurality of printing protocols, the plurality of printing protocols including at least one translation printing protocol which specifies that the source document is to be translated prior to printing, b) retrieving the source document from the folder of the external storage device or the remote location, c) identifying the printing protocol based on the information and d) when the printing protocol is one of the at least one translation printing protocols, obtaining a translation of the source document in a target language. The method further includes detecting the trigger event caused by connecting the external storage device with the printer, retrieving the source document from the folder of the external storage device or from the remote location, identifying the printing protocol based on the information, and, when the printing protocol is one of the at least one translation printing protocols, obtaining a translation of the source document in a target language and printing at least one of the source document and the translation of the source document on the printer.

DETAILED DESCRIPTION

Aspects of the exemplary embodiment relate to a printing system which enables the creation of machine translations of documents without intervention by the user. The machine translations may rely on local optical character recognition and language translation capabilities within the device itself, or may utilize remote resources. Aspects of the exemplary embodiment relate to a method of machine translation utilizing a printer. The printer provides different printing protocols, including one or more translation printing protocols, which is/are automatically selectable though information stored on an external storage device. This provides the user with a mechanism to translate documents instantly from the external storage device without the need to interact with the printer's local user interface. In specific embodiments, the user simply places the document(s) in a pre-determined folder within the external storage device. This, in turn, directs the printer to print the document(s) automatically in a specific language.

The term "external storage device" refers to any portable storage device that supports a memory and a physical or wireless communication bus. Examples include Universal Serial Bus (USB) memory drives, memory cards, hard drives, and the like.

A "peripheral port" refers to a port on a printer that allows coupling with the external storage device for facilitating communication with the external storage device.

The term "pre-set printing preferences" indicates default settings of a printer that can be configured by a user.

The term "optional instruction" refers to at least one print setting of the printer that is used to override printer's default print settings.

The term "access link" refers to any link that can be used to refer a file stored at a remote location, for example, URL, IP address, MAC address, Memory address, and like.

A "printer" refers to any device for rendering an image on print media, such as a stand-alone printer or multifunction device which provides additional functions, such as one or of scanning, archiving, emailing, and faxing.

A "digital document" may include one or more pages in electronic form, which may be referred to as images. An "image" generally may include information in electronic form which is to be rendered on the print media by the printer and may include text, graphics, pictures, and the like. A "file" can be a single digital document or can be a set of two or more digital documents that are to be printed according to a common printing protocol.

Figure 1:
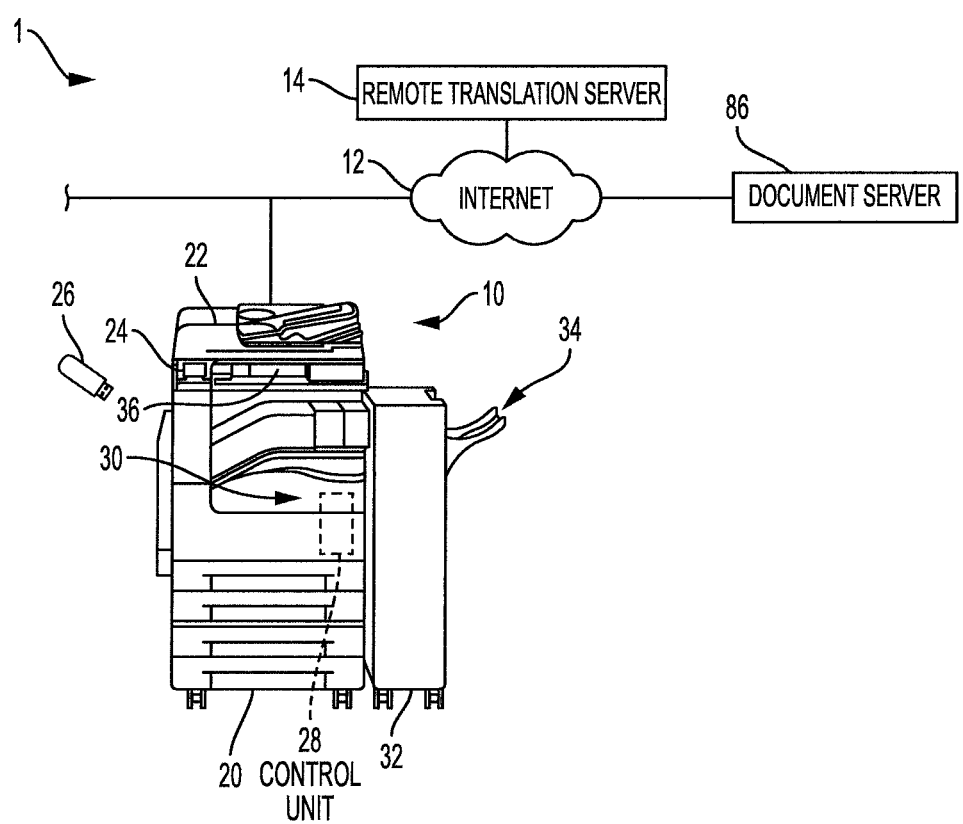
FIG. 1 is a schematic view of a printing system in accordance with one aspect of the exemplary embodiment.

With reference to FIG. 1, an exemplary printing system 1 includes a printer 10. The printer 10 may be connected by a network 12 to other devices, such as one or more local or remote computing devices 14.

The illustrated printer 10 includes a media supply unit 20, which includes one or more print media sources, such as paper trays. A document input unit 22 includes a peripheral port 24, such as a USB port, for receiving a document stored on a portable external storage device 26, such as a USB memory device. The external storage device 26 is configured for communicatively connecting with the peripheral port 24, which in turn, communicates with a control unit 28 of the image rendering apparatus.

A rendering unit 30, such as one or more marking engines, is configured for rendering documents on print media, such as paper, supplied by the media supply unit 20, using marking media, such as inks or toners. A finishing unit 32 receives the printed media from the rendering unit 30 and optionally provides one or more finishing operations, such as collating, stapling, binding, stacking, or the like. An output unit 34, such as an output tray or trays, outputs the finished, printed media. Units 20, 30, 32, 34 are connected by a paper path (not shown) made up of belts, rollers, or the like, for transporting the print media from the media supply unit 20 to the output unit 34, via the rendering unit 32 and finishing unit 34.

A local user interface device (LUI) 36 is mounted to an exterior of the image rendering apparatus 10, through which a user may interact with the control unit 28. The exemplary user interface device 36 includes a display device, such as an LCD screen, which can be manipulated by a user, e.g., using touch gestures.

Figure 2:
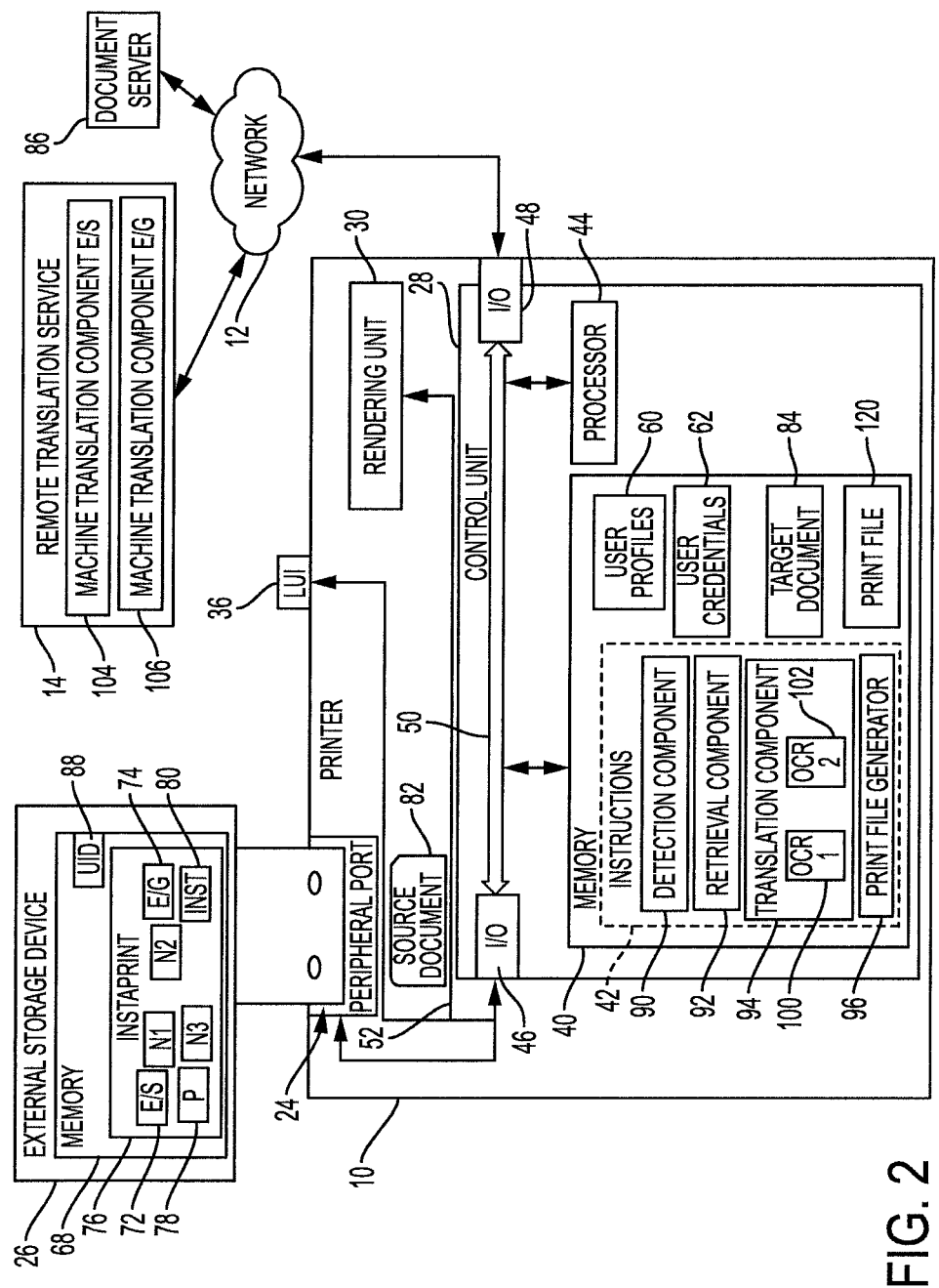
FIG. 2 is a function block diagram of part of the printing system of FIG. 1.
Figure 3:
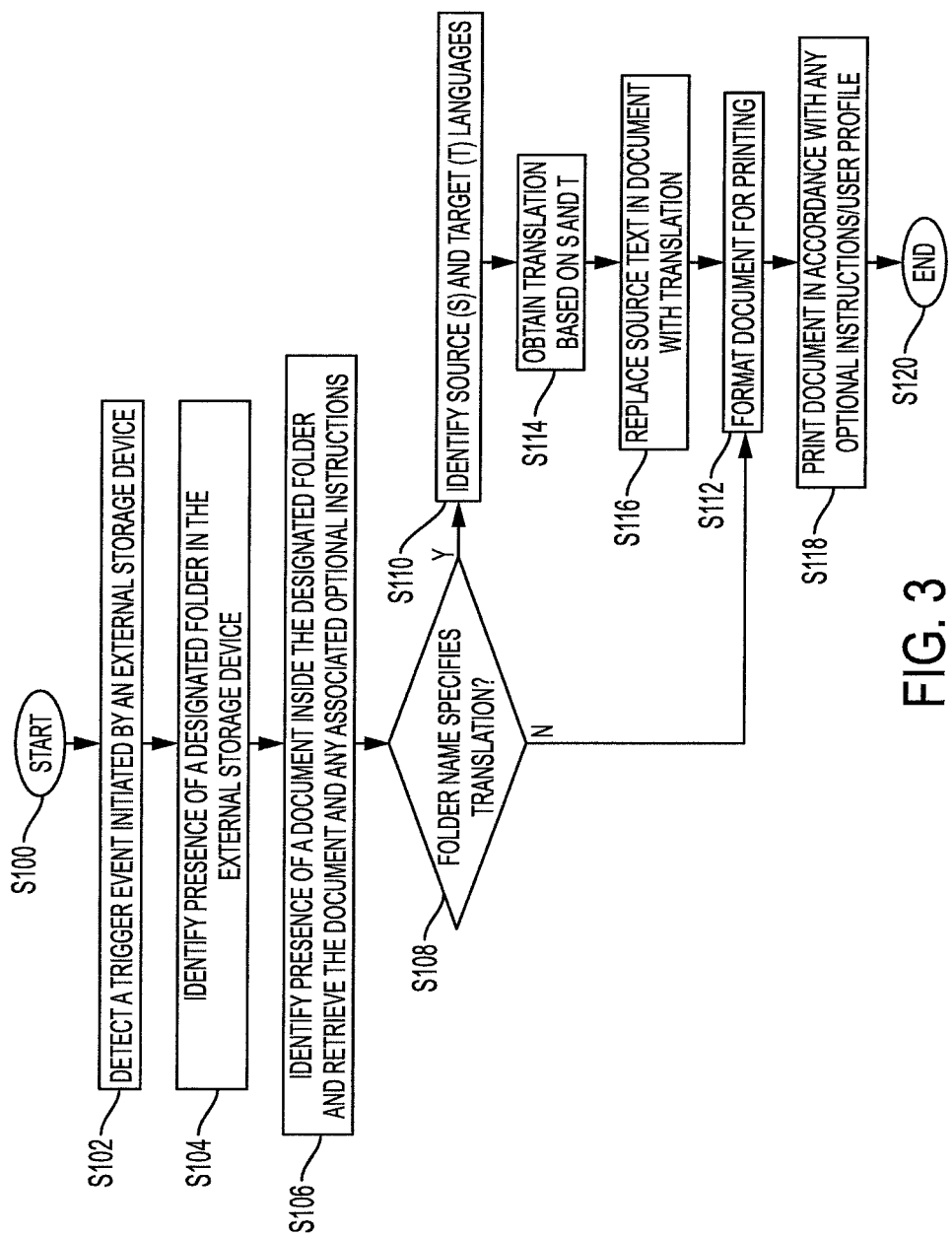
FIG. 3 illustrates a method for automated printing of document translations in accordance with another aspect of the exemplary embodiment.

As illustrated in FIG. 2, the exemplary control unit 28 includes memory 40, which stores software instructions 42 for performing the method illustrated in FIG. 3, and a processor 44, in communication with the memory, for executing the instructions. The control unit 28 also includes one or more input/output (I/O) devices 46, 48, for communicating with other components of the printer 10, such as the peripheral port 24, and/or external devices. For example, I/O device 48 may serve as a network adapter for connecting the printer 10 with the network 12.

Hardware components 40, 44, 46, 46 of the control unit 28 may communicate via a data/control bus 50.

The control unit 28 may also control various processing and operating functions of the printing operation, such as copying, printing, paper feeding, finishing, and the like and may be communicatively connected with the media supply unit 20, peripheral port 24, rendering unit 30, finishing unit 32, and local user interface 36, by wired or wireless connections 52. The control unit 28 may be located in/or otherwise local to the printer 10 or may be wholly or partially located elsewhere in the printing system 1, such as on a network print server (not shown).

The control unit 28 may include one or more computing devices, such as a central processing unit, microprocessor, or other computing device capable of executing instructions for performing the exemplary method. The memory 40 may represent any type of non-transitory computer readable medium such as random access memory (RAM), read only memory (ROM), magnetic disk or tape, optical disk, flash memory, or holographic memory. In one embodiment, the memory 40 comprises a combination of random access memory and read only memory. Memory 40 stores instructions for performing the exemplary method as well as the processed data. The digital processor device 44 can be variously embodied, such as by a single-core processor, a dual-core processor (or more generally by a multiple-core processor), a digital processor and cooperating math coprocessor, a digital controller, or the like. The I/O interfaces 46, 48 may comprise a modulator/demodulator (MODEM) a router, a cable, and/or Ethernet port. The network may include a communication network such as Internet, Intranet, PSTN, Local Area Network (LAN), Wide Area Network (WAN), Metropolitan Area Network (MAN), or combination thereof, or the like.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or the like, and is also intended to encompass so-called "firmware" that is software stored on a ROM or the like. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

The memory 40 may store profiles 60 of one or more users. In one embodiment, users of the printer 10 may create and store user print profiles 60 in the printer 10. Each user profile 60 can include the user's preferred print settings/print preferences. The users may use the graphical user interface (GUI) 36 of the printer 10 to input their profiles with the print settings/preferences in advance of printing a digital file. These define at least one print setting supported by the printer 10. Examples of the print setting(s) may include number of copies to be printed of a (translated) document, output size, contrast, color, paper type, printing resolution, duplex/single-side printing, margins, and combinations thereof. Print preferences can be print settings which can be ignored or modified if the printer is unable to apply them.

In addition, the memory 40 may store user log-in credentials 62, linked to the user profiles 60, for uniquely identifying a user and user's pre-stored print preferences/settings.

The external storage device 26 includes memory 68 with one or more locations configured for storing at least one document 70 in a source natural language, such as English or French (or an access link to the document 70 that is stored at a remote location), which is to be translated, prior to printing, into a target language, different from the source language. In the illustrated embodiment, memory 68 includes one or more folders 72, 74 that are named according to the target language (and optionally also the source language) for the translation to be performed. The folder names are denoted N1, N2, in FIG. 2 for ease of illustration. The folder name N1, N2 encodes translation-related information that enables the printer to identify a translation printing protocol. The name may be generated in a pre-defined naming format, such as "instaprint;SOURCE-TARGET", where instaprint denotes that the instant printing protocol is to be applied by the printer, SOURCE is the source natural language, TARGET is the target natural language, and the two are separated by a pre-determined delimiter, such as a dash. As an example, one folder 72 may have a name than includes English (the source language) and Spanish (the target language), e.g., "instaprint;English-Spanish", while another 74 may be named to indicate that the source language is English and the target language is German, e.g., "instaprint;English-German". The name of the file may encode the source and target languages using any suitable encoding protocol recognized by the printer, such as two letter codes or other character sequences. In other embodiments, the source language may be predefined (e.g., assumed to be a default language) or left to be identified by the printer control unit 28 or by the translation service 14. In such cases, only the target language may be specified in the folder name, e.g., "instaprint;German". The translation folders 72, 74 may be subfolders of a more general instaprint folder 76, which includes the folders 72, 74 and optionally other folders, such as folder 78 which may have a name N3 denoting that the files it contains are to be printed without translation, such as "instaprint;print".

The folders 72, 74, or the general folder 76, optionally include or encode (e.g. in the name of the folder or a parent folder) print-related instructions 80, such as some or all of the user's print setting(s), e.g., number of copies to be printed of the target and/or source document, output size, contrast, color, paper type, printing resolution, duplex/single-side printing, margins, finishing options (e.g., stapling, hole punching, binding, collating, etc.), and combinations thereof. As an example an instruction may specify "print source and target document," or "print target document only." In some embodiments, the folder name specifies whether the target document only or both the target document and source document is/are to be printed. For example, a folder name "instaprint;English-German" may be used encode that both source and target documents are to be printed while "instaprint;German" encodes that only the target document is to be printed.

For example, a user may wish to print a source document 70, which is in English, after it has been translated to form a target document 84, in Spanish. The source document may be on a hard drive of the user's computer or accessible, via an access link, from remote memory, e.g., on the Internet. The user may create a pre-designated folder 72 in the external storage device 26, if one does not already exist, with a pre-designated name (e.g., "instaprint;English-Spanish"), which is recognized by the control unit, and then copy the document 70 (stored on the hard drive), or the access link to that document, inside the pre-designated folder 72. In other embodiments, a separate folder may be used to store the access link. For example, the user may create a notepad file (or any type of document formatted file) inside the external storage device 26 with a pre-designated name (e.g., "instaprint;English-SpanishURL")) to store the URL of a document published on the Internet inside the notepad file. The notepad file may be used to provide the printer 10 with an Internet link corresponding to a printable file that is required to be fetched over the Internet from a document server 86 using the specified URL. The document server 86 may include any electronic device that can be connected to the network 12, for example, a data server, third party databases, hard drives, personal computer, a mobile phone, a smart phone, a personal digital assistant (PDA), a tablet computer, a laptop, etc.

If a user wishes to translate the source document 70 into two or more target languages, such as Spanish and German, the document 70, or its access link, may be stored in two separate folders 72, 74. Alternatively a multiple target language folder may be created, with a name such as "instaprint;English-Spanish;German" (or "instaprint;Spanish;German", when the source language is otherwise identified) may be created, which is recognized by the control unit as a request to provide printed translations of an English document in both Spanish and German.

The printer control unit 28 may be configured to identify the translation printing protocol from a set of two or more translation printing protocols. Each printing protocol specifies a source and a target language. Each of the printing protocols in the set differing from the others in at least one of the source language and the target language. The number of printing protocols is not limited and may be, for example, at least three or at least five or at least ten, depending, in part, on the number of translation resources available.

The external storage device 26 may also store a user identifier (UID) 88, which uniquely identifies the user. When the UID is communicated to the control unit, the user's profile 60 is retrieved.

After user inserts the external storage device 26 into the peripheral port 24, of the printer 10, the control unit 28 recognizes the name of the location 72 of the document 70 as instructions to print a target document 84 generated by translation of the source document 70. The document 84, when generated, is printed according to any associated print-related instructions 80, stored on the device 26 and/or retrieved from the user profile 60.

The illustrated instructions 42 include a detection component 90, a retrieval component 92, a translation component 94, and a print file generator 96.

The detection component 90 automatically detects a trigger event caused by coupling of the external storage device 26 with the printer 10, e.g. with the peripheral port 24. Assuming that the external storage device 26 includes a predesignated folder 72, 74, the detection component 90 detects the presence of the folder and its name. The detection component may also detect the stored UID 88 and any print-related instructions 80, e.g., by scanning the external storage device 26 for determining availability of at least one optional instruction in the external storage device 26 corresponding to at least one printable file. The optional instruction(s) may be encoded to a digital folder 72, 74, 76 on the external storage device storing the document(s) 70, encoded in the older name, encoded to the document(s) 70 themselves (e.g., as metadata), or a combination thereof. Further, the optional instruction may include at least one print setting information for the printer 10. In the absence of optional instruction(s) on the device 26 and/or in the user profile 60, or in the case where the printer is unable to comply with them, the printer 10 may be configured to perform printing using default print settings.

The retrieval component 92 causes the printer 10 to fetch the printable document(s) 70 stored in the external storage device 26 or at a remote location 86 (information corresponding to which is stored in the external storage device 26 in the form of an access link) via the network 12. The documents 70 stored in the folder(s) 74, 76 to be translated may be temporarily stored in memory.

The translation component 94 causes the retrieved documents 70 to be translated into the identified target language, e.g., as defined by the folder name. The translation component 94 may include or have access to one or more OCR components 100, 102, each OCR component dedicated to a specific language. The translation component 94 selects the OCR component according to the source language identified from the folder name for extracting the textual content of the document to be translated. The translation component 94 is provided with a translation(s) provided by an appropriate one of a set of translation components 104, 106, such as machine translation components. The appropriate translation component is selected based on the identified target language, e.g. encoded in the folder name. The translation service 14 may be a publically accessible translation service, such as Google Translate, or a translation service with translation components dedicated to a specific domain, which has been trained using documents of the type that the customer wishes to have translated, such as medical documents, scientific publications, or the like. While the illustrated translation components are located on a remote server 14, in other embodiments, one or more translation components may be located on the printer, e.g., stored in memory 40.

Figure 5:
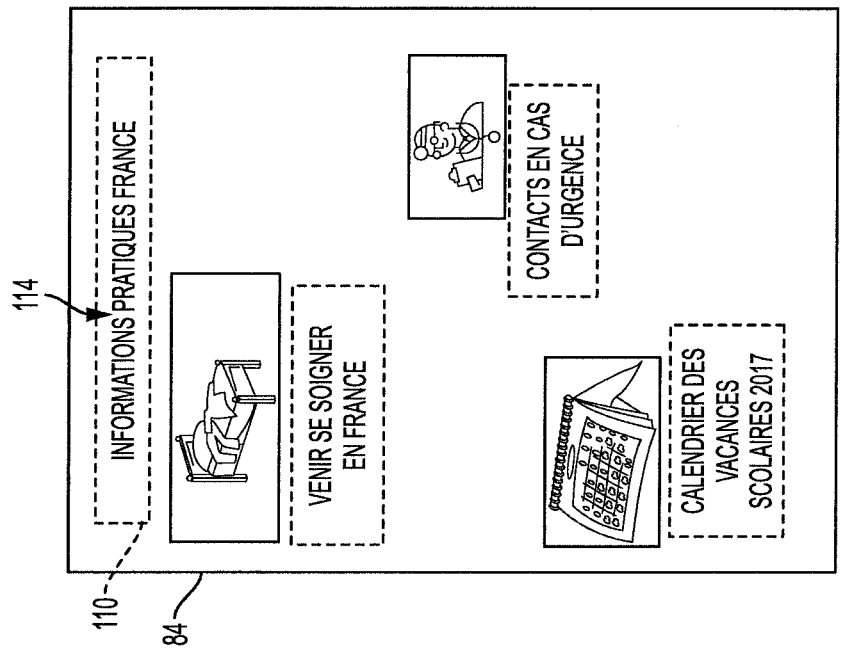
FIGS. 4 and 5 illustrate example source and target documents, respectively.
Figure 4:
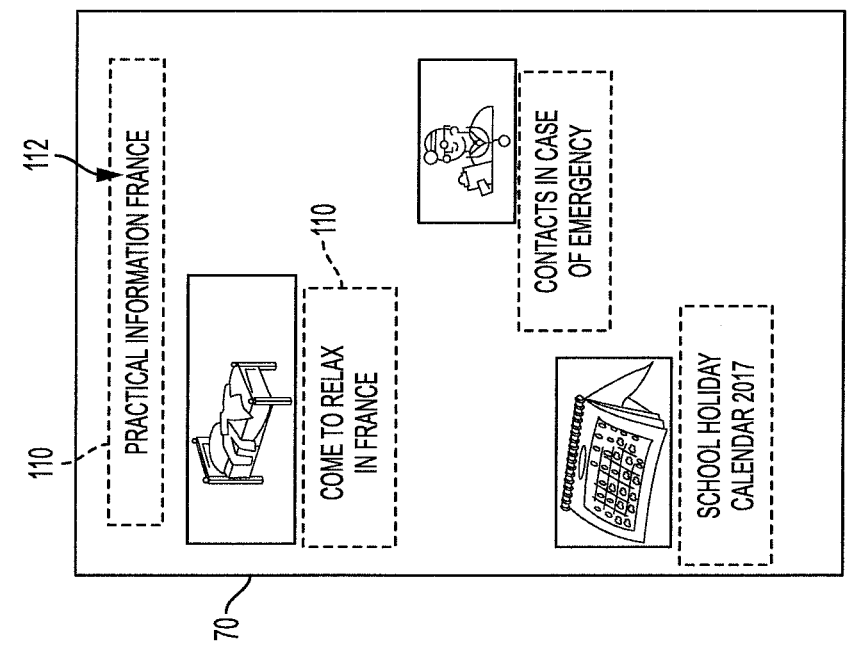

As illustrated in FIG. 4, the OCR component 100 or 102, which is selected for optical character processing of the document 70, segments each page of the document 70 to identify blocks 110 of textual content and extracts the text 112 from each block. The translation component 94 sends the extracted text content to the translation service 14 for translation by the machine translation component 104, 106. Each piece of source text 112 is separately translated to target text 114 by the selected translation component and then returned to the control unit 28, where it is inserted into a respective block 110 of the target document 84 (FIG. 5), by the translation component 94. Ideally, the overall arrangements of elements are preserved, and the text blocks, such as titles, captions, etc. are preserved in their approximate relationship to graphics or images in the document. Each text block in the target document thus corresponds, in general size, shape, and location, to the text block in the source document from which the source text was extracted. In this way, the target document 84 appears substantially identical in layout to the source document, the only difference being the text content 114.

The print file generator 96 converts the target document to a suitable form for printing (a print file 120) and outputs the print file to the rendering unit for printing. In generating the print file 120, the print file generator uses the print-related instructions 80, retrieved from the device 26, and/or the user profile 60 for the respective user, to the extent that these are available. The print file generator may be configured to use the pre-stored print preferences of a user if the user ID has been recognized. To the extent that the print-related instructions 80 and pre-stored settings are incompatible, the instructions 80 may take precedence. In the absence of print instructions, the printer 10 applies a set of default settings.

In some embodiments, the print-related instructions 80 for print settings may be encoded, at least in part, by a name of a folder. For example, a user may wish to print three copies of a target document translated from English to Spanish. Using a separate computer system, the user may create a designated folder within the English/Spanish folder 72, with a predefined name ("3" in the exemplary embodiment), which is recognized by the printer as an instruction related to printing. The source document 70 is then stored in this subfolder. After connecting the external storage device 26 to the printer 10, the print file generator 96 may generate instructions for the rendering unit 30 to automatically print three copies of the respective translated document 84 by recognizing the folder name of the sub-folder as an instruction for printing the three copies of the corresponding translated document.

As noted above, other print-related instructions 80 for printing may be encoded by the folder name. For example, a sub-folder named "3_double_BNW" may be recognized by the control unit as an instruction to print three copies of the translated document with "double side" page printing in "black and white" color option. Finishing options may also be incorporated in the folder name. A folder named "20PS", for example, may be interpreted as an optional instruction to print 20 copies with 'Punch' and 'Staple' on the printed papers. Alternatively or additionally, a plurality of print settings may be embedded and/or encoded to a file or a folder on the external storage device for instructing the printer 10 to print accordingly. Such instructions may need to be restricted under certain syntax rules.

In some embodiments, the optional instructions may include the source language name.

As will be appreciated, the exemplary embodiments are not restricted to any particular format of encoding translation and/or print settings which are recognizable by the printer. The exemplary method allows encoding translation and/or print instructions in a user friendly manner, which can dramatically reduce human effort in printing a variety of translated or untranslated documents in various quantities. The embodiment are intended to include or otherwise cover all permutations and combinations of translation and print settings stored inside files/folders and on file-names/folder-names. It can therefore be beneficial to allow a user to use his/her portable memory devices for taking printouts with desired print settings, without interaction with user interfaces of printers, and with minimal or no wait time.

In one embodiment, the printer 10 can be configured for automatically printing translations of documents stored inside the external storage device 26 using pre-set printing preferences. In an embodiment, the pre-set printing preferences are configurable by a user of the printer 10 via a user interface, such as a webpage, or via the LUI 36. In other embodiments, default print settings may be applied. The pre-set printing preferences may define a number of copies to be printed of the printable file in absence of the optional instruction. The pre-set printing preferences can include print layout settings.

With reference to FIG. 3, a computer-implemented method for automatically printing translations of documents from an external storage device without any user intervention, in accordance with an embodiment which can be performed in the printing system of FIGS. 1 and 2, is illustrated. The method begins at S100.

It is assumed that provision may be made to a user to store a user profile 60 in memory accessible to the printer, prior to performing the method.

It is assumed that a user stores a document 70 (or access link for the document) in a dedicated folder 72, 74, 78 on the external storage device 26 and that in creating folders, uses a folder naming protocol which is understood by the printer as instructions for printing with or without translation, enabling the printer 10 to uniquely identify the folder containing the document/link. In one embodiment, the name of the designated folder may be pre-set with the printer 10 by the user via a command provided to control unit 28 through the printer LUI 36. For example, if a user pre-sets a name of the designated folder as "instaprint;English-Spanish" then the printer 10 may be configured to search for a folder in the external storage device 26 with the name "instaprint;English-Spanish" to locate any documents/links thereto which are to be translated from English to Spanish and then printed. In other embodiments, the user may be provided with the folder naming protocol, e.g., via an Instaprint user instruction guide, or through a user interface which automatically formats the external storage device 26 for a user, e.g., given user-selected languages.

It is also assumed that optional instructions may be encoded to the external storage device, for example, to the designated folder or a sub-folder or parent folder of the designated folder, or are encoded in the documents themselves. A folder may be encoded with the optional instructions either by adding instruction details in name of the folder or by adding a dedicated setting file or information inside the folder. The format of adding the instruction information is not limited, and any computer readable format may be used to provide the instruction details.

At S102, when a user plugs the external storage device 26 into the printer 10, a trigger event is detected, by the detection component 90, caused by connection with the external storage device 26.

At S104, a presence of one or more designated folder(s) 72, 74, 78 in the external storage device 26 is detected, e.g., by the detection component.

At S106, a presence of one or more documents 70 (or access link thereto) inside the designated folder(s) 72, 74, 78 is detected and the detected document(s) is/are retrieved from the designated folder(s) (or from the remote storage location using the access link). Any associated print-related instructions 80 available in the external storage device 26 are identified, e.g., from the folder name, or otherwise stored/encoded, and retrieved. A user identifier 88 may also be detected, e.g., from the external storage device 26.

At S108, if the name of the folder 72, 74 is associated with a translation protocol, the method proceeds to S110, otherwise to S112.

At S110, the source language of the retrieved document 70 and the target language to which it is to be translated are identified, e.g., from the folder name. In some embodiments, the source language may be automatically identified by the translation service.

At S114, a translation of the document 70 is obtained, based on the source and target languages. Further details on this step are described below, with reference to FIG. 6.

At S116, the translated document is generated. In one embodiment, source text in the source document 70 is replaced with the translated text. In this embodiment, the formatted document 84 may substantially duplicate the formatting of the original, untranslated document 70. In other embodiments, a different format may be used, such as a "text only" format.

At S112, the document is formatted for printing with a printing protocol in accordance with any retrieved optional instructions and/or the user's profile identified from the user ID 88. In the absence of instructions, the printer's default printing protocol is used.

At S118 a print file 120, containing the document 84 in a suitable format for printing, is output, e.g., to the rendering unit 30, for rendering on print media in accordance with the identified printing protocol and subsequently to the finishing unit 32, to be finished according to the identified printing protocol.

The method ends at S120.

The entire method, from step S202 to S118, can thus proceed without any user interaction with the LUI 36.

As will be appreciated, the method illustrated in FIG. 3 can handle documents for automatic printing without translation as well as documents to be printed following translation. At S108, if the folder name does not specify translation, e.g., in the case of a source document or access link being present in folder 78, the method proceeds directly to S112.

Figure 6:
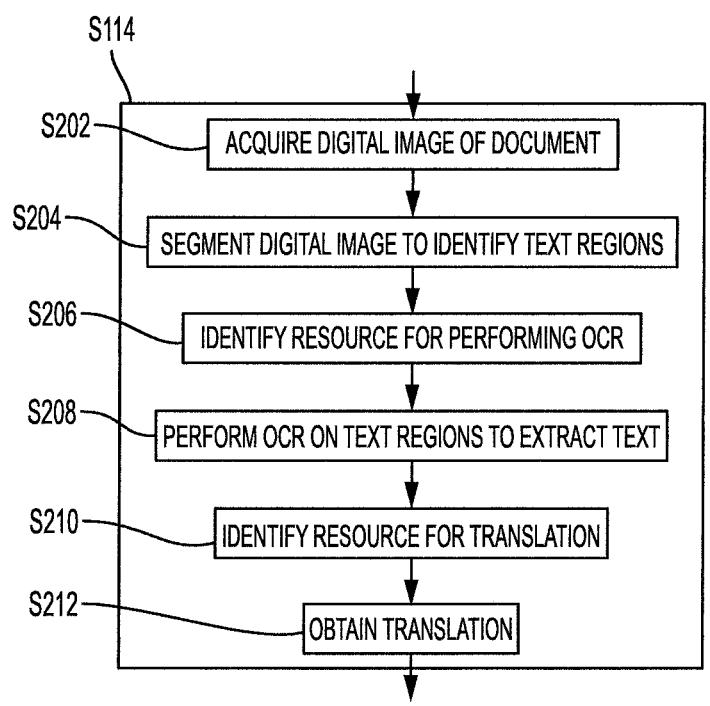
FIG. 6 illustrates part of the method of FIG. 3.

With reference now to FIG. 6, S114 may proceed as follows. At S202, if the document is in an image format such as a PDF document, at least one digital document image is obtained.

At S204, each digital image is segmented to identify text blocks 110, or more generally, regions of text, by the OCR component.

At S206, an appropriate resource 100, 102 for performing optical character recognition is identified, e.g., based on the source language identified based on the folder name.

At S208, OCR is performed, by the identified OCR resource, to extract the text 112 contained in the text regions 110.

At S210, an appropriate resource for translating the extracted text is identified, from a plurality of available resources 104 106, based on the identified source and target languages.

At S212, a translation of each piece of extracted text is obtained from the identified translation resource. If the text is translated by an external resource, the translated text may be returned to the printer over the appropriate network or internet connection 12. The method then proceeds to S116.

As will be appreciated, for a document 70 that does not require OCR processing, e.g., a Word document, the method at S116 may entail extracting the blocks of text and obtaining a translation of each text block.

In some embodiments, various steps may all be performed by the same external resource, such as, for example, the optical character recognition, translation, and formatting of the translated document. Further, these steps may not require separate intervention, requests, or commands by the printer, but may be initiated by a single transmission or transaction.

The method illustrated in FIGS. 3 and 6 may be implemented in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other non-transitory medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer (s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIGS. 3 and/or 6, can be used to implement the method. As will be appreciated, while the steps of the method may all be computer implemented, in some embodiments one or more of the steps may be at least partially performed manually.

Example Workflows

Workflow 1: A user wants to translate and print an English document in Chinese. The user copies the English document in the folder named "Insta-print;Chinese" in the USB drive 26. The user plugs in the USB drive into the printer. The printer translates and prints the document in Chinese using the default "Insta-print" settings.

Workflow 2: A user wishes to translate and print a document(s) in multiple languages. The user copies the document(s) to a folder whose name contains English and Spanish separated by a pre-determined delimiter (e.g., "Insta-print;English-Spanish"). The user plugs in the USB drive into the printer. The printer translates and prints the documents in both English and Spanish.

Workflow 3: The user wishes to translate and print a document(s) available in a remote location. The user copies the URL of the document(s) to a folder named "Insta-print; Portuguese" in the USB drive. The user plugs in the USB drive into the printer. The printer pulls the document(s) from the remote location, translates and prints in Portuguese.

The described method system and method thus provide for automatic translation and printing of documents without any need for the user to interact with the Local User Interface (LUI) using a printer that automatically recognizes the directory structure on the external storage device, then translates and prints the file(s) in the directory. Advantages of the method include that a user can print a translated document easily when the user does not know the language currently set on the printer LUI. It is useful when the user is unfamiliar with the translation applications available on the printer. It is also useful when the LUI is in a language unfamiliar to the user. The user can print without having to change the LUI language.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for automatically printing a translation of a document comprising:
   detecting a trigger event caused by connecting an external storage device with a printer, the external storage device including a folder storing at least one of a source document, in a source natural language and an access link to the source document stored at remote location, the folder including information which enables the printer to identify a printing protocol from a plurality of printing protocols, the plurality of printing protocols including at least one translation printing protocol, which specifies that the source document is to be translated, prior to printing, into a specified target natural language different from the source natural language, and another printing protocol which is to print the source document without translation;
   retrieving the source document from the folder of the external storage device or from the remote location;
   identifying the printing protocol based on the information wherein the information is encoded in a name of the folder;
   when the printing protocol is one of the at least one translation printing protocols, obtaining a translation of the source document in the target natural language and printing the translation of the source document on the printer; and
   when the another printing protocol is to print the document without translation, printing the source document without translation into the target natural language.

2. The method of claim 1, wherein the identifying the printing protocol includes, with a processor of the printer, executing instructions for identifying a translation printing protocol based on the name of the folder.

3. The method of claim 1, wherein the information includes translation-related information which identifies the source natural language.

4. The method of claim 3, wherein the information includes print-related information comprising print settings for printing the translation of the document.

5. The method of claim 4, wherein the print settings are selected from the group consisting of number of copies to be printed of the translated document, output size, contrast, color or black and white printing, paper type, printing resolution, duplex/single-side printing, margins, finishing options, and combinations thereof.

6. The method of claim 1, wherein the printing protocol is identified based, in part, on information stored in a user profile on the printer.

7. The method of claim 1, wherein the external storage device includes a hierarchy of folders which include the folder, a name of one of the folders which is a parent or child of the folder containing the document or access link thereto including a name which encodes print-related information that is used by the printer in printing the translated document.

8. The method of claim 1, wherein the obtaining of the translation of the document in the target natural language comprises extracting text from text blocks in the source document, obtaining a translation of the extracted text and generating a target document by replacing the extracted text in the text blocks with the respective translated text.

9. The method of claim 1, wherein the optional instruction is encoded to a sub-folder residing inside a pre-designated folder, the sub-folder further comprising at least one of a printable file, and the access link to the printable file.

10. The method of claim 1, wherein the plurality of printing protocols includes a plurality of translation printing protocols, each of the translation printing protocols differing from the others of the translation printing protocols in at least one of the source natural language and the target natural language.

11. The method of claim 1, wherein there is no interaction between a user and a local user interface of the printer between the detecting of the trigger event and the printing of the translated document.

12. A computer program product comprising a non-transitory recording medium storing instructions, which when executed on a printer control unit, cause the printer to perform the method of claim 1.

13. The method of claim 1, wherein at least one translation printing protocol includes at least two translation printing protocols, one translation printing protocol for each of first and second target natural languages.

14. A printer for automatically printing a translation of a source document comprising:
a peripheral port for communicating with an associated external storage device;
a control unit, in communication with the peripheral port, including memory storing instructions and a processor for implementing the instructions, the instructions including instructions for:
detecting a trigger event caused by connecting the external storage device with the peripheral port, the external storage device including a folder storing at least one of a source document in a first natural language and an access link to the source document stored at remote location, the folder including information encoded in a name of the folder, which enables the printer to identify a printing protocol from a plurality of printing protocols, the plurality of printing protocols including at least one translation printing protocol which specifies that the source document is to be translated, prior to printing, into a specified target natural language, different from the first natural language, and another printing protocol which is to print the source document without translation;
retrieving the source document from the folder of the external storage device or the remote location;
identifying the printing protocol based on the information; and
when the printing protocol is one of the at least one translation printing protocols, obtaining a translation of the source document in the target natural language; and
a rendering unit which prints the translation of the source natural language document into the target natural language.

15. The printer of claim 14, wherein the at least one translation printing protocol comprises a plurality of translation printing protocols.

16. The printer of claim 14, further comprising a network interface for communicating with a remote translation service that provides a translation of text of the source document.

17. In combination, the printer of claim 14 and the external storage device.

18. A method for automatically printing a translation of a document comprising:
providing in a memory of a printer, instructions for:
detecting a trigger event caused by connecting an external storage device with a peripheral port, the external storage device including a folder storing at least one of a source document and an access link to the source document stored at remote location, a name of the folder including information which enables the printer to identify a printing protocol from a plurality of printing protocols, the plurality of printing protocols including at least one translation printing protocol which specifies that the source document is to be translated from a first natural language to a target natural language prior to printing;
retrieving the source document from the folder of the external storage device or the remote location;
identifying the printing protocol based on the information in the name of the folder; and
when the printing protocol is one of the at least one translation printing protocols, obtaining a translation of the source document in the target natural language;
detecting the trigger event caused by connecting the external storage device with the peripheral port of the printer;
retrieving the source document from the folder of the external storage device or from the remote location;
identifying the printing protocol based on the information in the name of the folder;
when the printing protocol is one of the at least one translation printing protocols, obtaining the translation of the source document in the target natural language, the target natural language being identified from the name of the folder; and
printing at least one of the source document and the translation of the source document on the printer.

* * * * *